(12) United States Patent
Connolly et al.

(10) Patent No.: US 11,340,875 B2
(45) Date of Patent: May 24, 2022

(54) SEARCHABLE STORAGE OF SEQUENTIAL APPLICATION PROGRAMS

(71) Applicant: SRI International, Menlo Park, CA (US)

(72) Inventors: Christopher Connolly, San Jose, CA (US); Maneesh Yadav, San Francisco, CA (US); Patrick D. Lincoln, Woodside, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/891,024

(22) Filed: Jun. 2, 2020

(65) Prior Publication Data

US 2021/0373864 A1    Dec. 2, 2021

(51) Int. Cl.
*G06F 9/44* (2018.01)
*G06F 8/41* (2018.01)
*G06F 8/71* (2018.01)
*H04L 9/06* (2006.01)

(52) U.S. Cl.
CPC .............. *G06F 8/4441* (2013.01); *G06F 8/71* (2013.01); *H04L 9/0643* (2013.01); *H04L 2209/38* (2013.01)

(58) Field of Classification Search
CPC ..................................................... G06F 8/4441
USPC ........................................................ 717/151
See application file for complete search history.

(56) References Cited

U.S. PATENT DOCUMENTS

| 7,171,535 B2 * | 1/2007 | Naoi ..................... G06F 9/3875 711/169 |
| 8,954,986 B2 * | 2/2015 | Rajagopalan ......... G06F 9/4881 718/107 |
| 10,579,368 B2 * | 3/2020 | Wisnovsky ......... G06F 16/2365 |
| 10,594,495 B2 * | 3/2020 | High .................. G06F 16/2365 |
| 2007/0221850 A1 * | 9/2007 | Panin .................... G01T 1/1617 250/363.04 |
| 2009/0007085 A1 * | 1/2009 | Owen ................. G06F 9/45516 717/146 |
| 2009/0313700 A1 * | 12/2009 | Horne ................... G06F 21/564 726/24 |
| 2017/0279818 A1 * | 9/2017 | Milazzo .............. H04L 63/1433 |
| 2021/0056146 A1 * | 2/2021 | Pokorny ............... G06F 16/953 |
| 2021/0326175 A1 * | 10/2021 | Herbert ................. G06F 9/4881 |

* cited by examiner

*Primary Examiner* — Evral E Bodden
(74) *Attorney, Agent, or Firm* — Moser Taboada (57) ABSTRACT

A method, apparatus and system for enabling the searchable storage of sequential application programs includes normalizing the sequential application programs, canonicalizing the sequential application programs, determining a unique identifier for each of the sequential application programs, and storing the unique identifier for each of the sequential application programs. The stored, unique identifier for the canonicalized sequential application programs can then be searched to, for example, determine if a sequential application program is stored and/or to certify at least one of the stored, canonicalized sequential application programs.

20 Claims, 4 Drawing Sheets

SEARCHABLE STORAGE OF SEQUENTIAL APPLICATION PROGRAMS

FIELD

Embodiments of the present principles generally relate to intelligent storage, and more particularly, to methods, apparatuses, and systems for searchable storage of sequential application programs (SAPs).

BACKGROUND

Scientific computation, such as for example astrophotography, neural electric field potential recordings, genomics, X-Ray diffraction data and the like, in many contexts consists of sequential application programs (SAPs) such as data processing pipeline's (DPPs). DPPs are programs written in a typical programming language, such as python, R, MATLAB, C, and the like, that primarily consist of sequential applications of processes from sophisticated mathematical/statistical/signal processing libraries in which processes from the library transform data in a step-wise fashion, where each step feeds the output as an input to the next step.

A deficiency that exists in either a centralized or distributed (e.g., Blockchain) data storage systems for sequential application programs such as DPPs is the ability to query if a given sequential application program is stored within the system and more specifically to determine if a specific sequential application program has already been deposited/stored in the storage system. In general, two sequential application programs (which DPPs are a subset of) with different source code can be considered equivalent if the programs both produce a same output for the same inputs. Currently, no general procedure exists for determining if any two programs are equivalent in such a way as such making it difficult if not impossible to determine if a specific sequential application program has already been deposited/stored in a storage system.

SUMMARY

Embodiments of methods, apparatuses and systems for searchable storage of sequential application programs (SAPs) are disclosed herein.

In some embodiments in accordance with the present principles, a method for searchable storage of sequential application programs includes normalizing the sequential application programs, canonicalizing the sequential application programs, determining a unique identifier for each of the sequential application programs, and storing the unique identifier for each of the sequential application programs.

In some embodiments, the method can further include searching the stored, unique identifiers of the canonicalized sequential application programs to, for example, determine if a sequential application program has been stored and/or to certify at least one of the stored canonicalized sequential application programs.

In some embodiments, the method can further include creating a repository of source codes for the sequential application programs.

In some embodiments in accordance with the present principles, an apparatus for searchable storage of sequential application programs includes a normalizing module normalizing the sequential application programs, a canonicalizing module canonicalizing the sequential application programs, a fingerprinting module determining a unique identifier for each of the sequential application programs, and a storage module storing the unique identifier for each of the sequential application programs.

In some embodiments, the apparatus can further include a search module to determine if a sequential application program has been stored and/or to certify at least one of the stored canonicalized sequential application programs.

In some embodiments in accordance with the present principles, a non-transitory computer-readable medium includes stored thereon at least one program, the at least one program including instructions which, when executed by a processor, cause the processor to perform a method for enabling the searchable storage of sequential application programs, including normalizing the sequential application programs, canonicalizing the sequential application programs, determining a unique identifier for each of the sequential application programs, and storing the unique identifier for each of the sequential application programs.

In some embodiments, the method of the non-transitory computer-readable medium further includes searching the stored canonicalized sequential application programs to, at least one of, determine if a sequential application program has been stored and certify at least one of the stored canonicalized sequential application programs.

In some embodiments of the non-transitory computer-readable medium, the canonicalized sequential application programs are stored in a local storage.

In some embodiments of the non-transitory computer-readable medium, the local storage includes at least one blockchain.

In some embodiments of the non-transitory computer-readable medium, the canonicalized sequential application programs are stored in a remote storage including at least one network storage device and cloud storage, Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for searchable storage of sequential application programs (SAPs). While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to data processing pipelines, such teachings should not be considered limiting. Embodiments in accordance with the present principles can be applied to other application programs and specifically for other sequential application programs within the concepts of the present principles.

In some embodiments, the term sequential application program as used herein is intended to refer to and include programs, programming language, formulas and the like implemented for the purposes of performing computations and operations. In some embodiments, the term sequential application program(s) as used herein is also intended to refer to and include sequential data, such as data stored according to a date or time having a commonality such as a common user, data source and the like.

The term canonicalization as used herein is intended to refer to an agreed upon common abstraction of groups of sequential application programs as defined herein. For example, users of a system in accordance with the present principles can agree to define at a very high/med/low level, a commonality (function/data source) between a group(s) of sequential applications programs, as defined herein. That is, in some embodiments, an agreed upon common abstraction for a group(s) of sequential applications programs can be defined at a very high level (e.g., broad) such that many sequential application programs, as defined herein, can be included in such a grouping, for example, as a result of a search. In some embodiments, an agreed upon common abstraction for a group(s) of sequential applications programs can be defined at a very low level (e.g., narrow) such that fewer sequential application programs, as defined herein, would be included in such a grouping. In some embodiments, an agreed upon common abstraction for a group(s) of sequential applications programs can be defined at any level in between a highest abstraction level and a lowest abstraction level.

Some embodiments in accordance with the present principles enable the translation of sequential application programs into low-level, simplified representations which are amenable to known, efficient methods for representation of these programs in what can be considered canonical form. Such simplified, canonical forms are, in general, undeterminable for typical programming languages as a consequence of fundamental computer science. Some embodiments in accordance with the present principles transform typical programming language into a canonical form by only using a subset of operations found in the typical programming language, such that the typical programming language can be translated into representations amenable to efficient canonicalization and/or capable of membership of a canonical equivalence set of programs.

Non-limiting examples of such typical programming languages that can be canonicalized in accordance with embodiments of the present principles include, but are not limited to, Discrete finite automata, Limited depth circuits, Simply-typed lambda calculus with product types, Simply-typed lambda calculus with sum and product types, and the like. In some embodiments in accordance with the present principles, the canonical representations exclude high level constructs, such as recursion, loops, unbounded sets etc. The canonical representations are able to 'import' definitions of complex functions from external programming languages that are annotated with certain guarantees about the behavior of the programming languages.

Some embodiments in accordance with the present principles transform sequentially stored data into a canonical form by defining an agreed upon commonality for the data (e.g., a common user/data source in addition to a date or time range) found in typical data sets, such that the typical sequentially stored data sets can be translated into representations amenable to efficient canonicalization and/or capable of membership of a canonical equivalence set of sequentially stored data sets.

Some embodiments in accordance with the present principles provide novel methods, apparatuses and systems for enabling searchable storage of sequential application programs. In some embodiments in accordance with the present principles, a sub-programming language that is computationally tractable and extensible is constructed for a set of sequential application programs, such as DPPs (written in standard programming language environments) so that sequential application programs can be practically stored and queried for certification and/or for existence. In some embodiments, the sub-programming language in accordance with the present principles can be stored in a centralized storage system, such as blockchains, enabling a verification of the existence (i.e., conception) of a sequential application program and a verification of the operation of the sequential application program.

Figure 1:
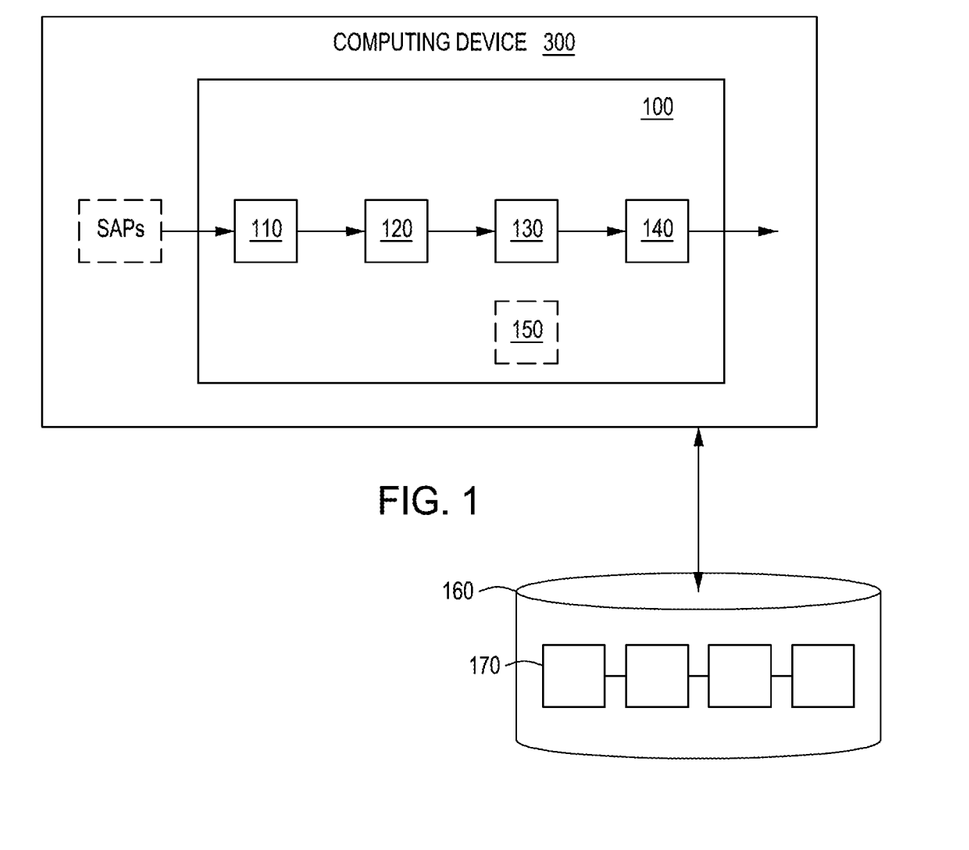
FIG. 1 depicts a high-level block diagram of a system for enabling the searchable storage of sequential application programs in accordance with an embodiment of the present principles.

FIG. 1 depicts a high-level block diagram of a system 100 for enabling the searchable storage of sequential application programs in accordance with an embodiment of the present principles. The system 100 of FIG. 1 illustratively comprises a normalizing module 110, a canonicalizing module 120, a fingerprinting (hashing) module 130, and a storage module 140. FIG. 1 further illustratively comprises an optional searching module 150 described in greater detail below. FIG. 1 further illustratively comprises an optional local storage 160 also described in greater detail below.

As depicted in FIG. 1, embodiments of a system for searchable storage of sequential application programs can be implemented in a computing device 300 (described in greater detail in FIG. 3) in accordance with the present principles. That is, in some embodiments, sequential application programs to be canonicalized and stored in accordance with the present principles can be received by the system 100 for searchable storage of sequential application programs from the computing device 300. Results of the system for searchable storage of sequential application programs in accordance with the present principles can be presented to a user using an output device of the computing device 300, such as a display, a printer or any other form of output device described in further detail below with reference to FIG. 3.

In some embodiments, the normalizing module 110 is implemented to determine a centrally defined equivalence class of the platform in which the sequential application programs are meant to run. That is, in some embodiments the normalizing module 110 determines a global level of commonality (e.g., abstraction/complexity) at which all of the sequential application programs are to be normalized. In some embodiments involving programming language, the normalizing module 110 hashes a combination of the salient programming language interpreter/compiler/system libraries, etc., of the sequential application programs to normalize the programs.

As previously stated, in some embodiments, the sequential application programs can include programs implemented by a user for scientific computation, such as for example astrophotography, neural electric field potential recordings, genomics, X-Ray diffraction data and the like. The hash performed by the normalizing module 110 can be considered a 'platform tag'. That is, in some embodiments the hash performed by the normalizing module 110 can determine version numbers for hardware and appropriate software (operating system, programming language environment, library version numbers etc.) by programmatic query via procedural calls to the operating system and package management software.

In some embodiments involving sequential data, the sequential data can be normalized by the normalizing module 110. More specifically, in some embodiments, sequential data can be normalized and stored such that a storage means can be searched for normalized data to attempt to find a match of searched sequential data to, for example, assist with certification. In some embodiments in accordance with the present principles, data normalization can include column ordering, outlier elimination and the like. Normalization can further include defining a common date and/or time construct among data sets of sequential data, defining a common construct for identifying data types, and the like. For example, in some embodiments, the date can be normalized to include the month first, then the date, and then the year. In some embodiments, sequential data normalization can include identifying a source of data by last name first and first name last and/or by an incorporation name, and the like. Such normalization in accordance with embodiments of the present principles enables easier verification of the sequential application programs.

Figure 3:
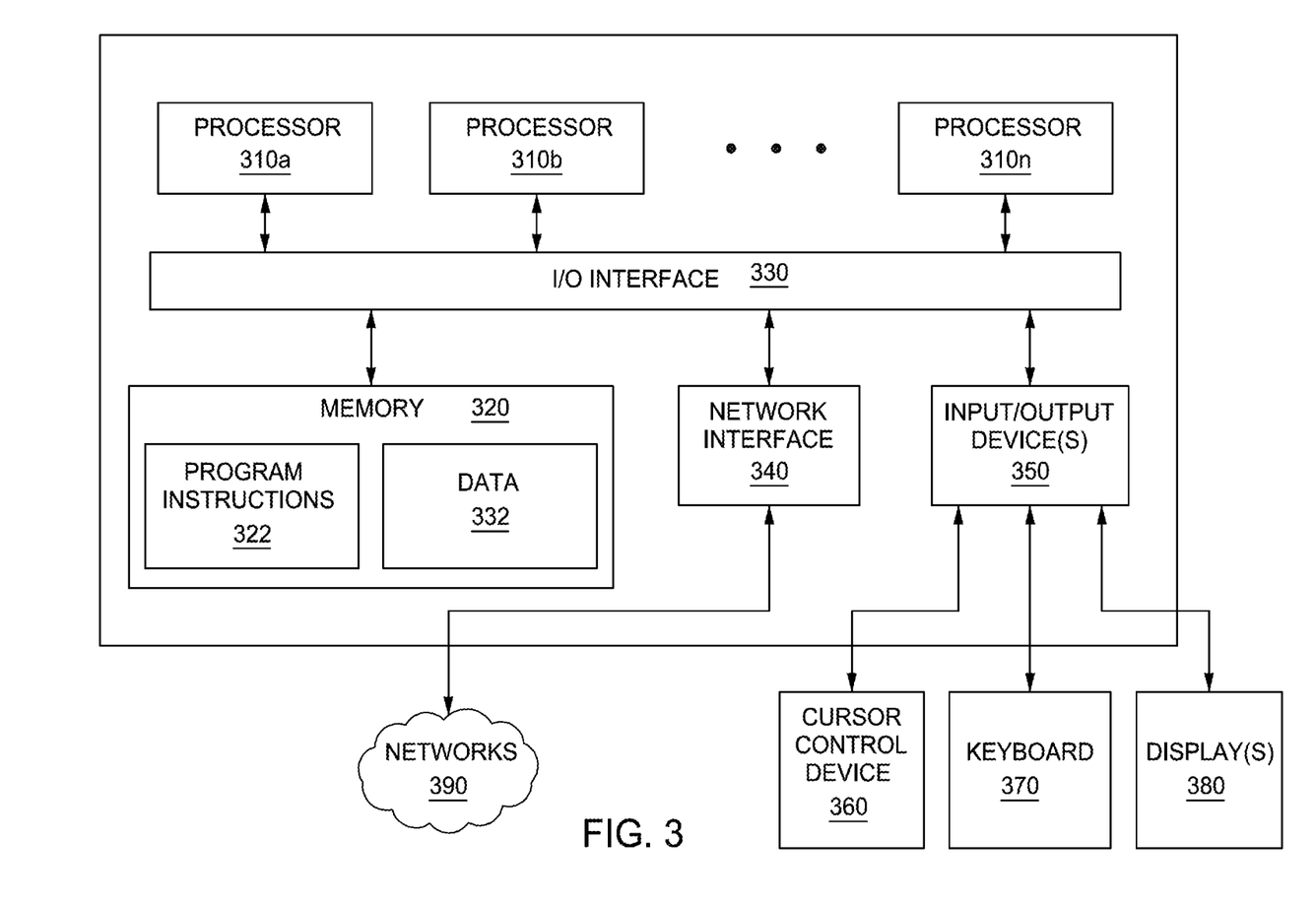
FIG. 3 depicts a high-level block diagram of a computing device for implementing embodiments of a system for enabling the searchable storage of sequential application programs in accordance with the present principles.

In some embodiments in accordance with the present principles, a user of the system 100 for searchable storage of sequential application programs can provide an input to the normalizing module 110 using, for example, any of the input means available via the computing device 300 (described in greater detail below), the input from the user having at least a partial influence in the centrally defined equivalence class (i.e., normalization) of the platform determined by the normalizing module 110. In some embodiments, the user input to the normalizing module 110 entirely determines the centrally defined equivalence class determined by the normalizing module 110. In some embodiments, the user input to the normalizing module 110 only partially influences the centrally defined equivalence class determined by the normalizing module 110 and other factors, such as the data and information associated with the sequential application programs influence the centrally defined equivalence class determined by the normalizing module 110. In some embodiments, the data and information associated with the sequential application programs entirely determines the centrally defined equivalence class determined by the normalizing module 110.

Referring back to the system 100 for searchable storage of sequential application programs of FIG. 1, the canonicalizing module 120 canonicalizes the classified sequential application programs. As a simple generalized example, a pseudo-code consisting of three functions A, B and C (without any defined bodies) having properties including no "side effects" (changes in machine state that would affect execution of another function), no parametric polymorphism, no unbounded types etc., can be represented as follows:

def A:
. . .
def B:
. . .
def C:
. . .

In some embodiments, a simple program that can implement the above defined function definitions can include a sequential application program, which can be represented as follows:

C( )
B( )
A( ).

Given that A, B and C are programmed with certain guarantees about properties including side effects, termination, concurrency etc., the execution sequence can be rewritten in canonical form in accordance with embodiments of the present principles. For example, in one embodiment lexical ordering can be used to rewrite the sequential program as follows:

A( )
B( )
C( ).

Any permutation of the sequential execution of A, B and C would result in the same program depicted above. That is, two canonicalized sequential application programs are considered equivalent in accordance with the present principles if the canonicalized sequential application programs both produce the same output for equivalent inputs.

In some embodiments, standard language constructs like operator precedence etc. can be employed to facilitate the efficiency with which programs are canonicalized. Data Processing Pipelines (DPPs) often consist of similarly structured sequences consisting of sequential applications of functions representing complex data analysis procedures. As such, a canonicalizing module in accordance with the present principles, such as the canonicalizing module 120 of FIG. 1, is able to canonicalize DPPS as described above.

In a specific embodiment in accordance with the present principles including programs, the classified sequential application programs from the normalizing module 110 are canonicalized by the canonicalization module 120 by transforming the sequential application programs to an abstract deterministic finite state automaton (DFA) and computing the minimum DFA O(n log n). That is, in automata theory, DFA minimization is the task of transforming a given deterministic finite automaton (DFA) into an equivalent DFA that has a minimum number of states. In such embodiments, two DFAs are considered equivalent if the DFAs recognize the same regular language. That is, in such embodiments DFAs can be implemented to find complementary language and the union/intersection of the languages recognized by DFAs representative of respective sequential application programs.

Similarly, in some embodiments in accordance with the present principles including sequential data, the classified sequential application programs from the normalizing module 110 are canonicalized by the canonicalization module 120 by defining a minimum number of commonalities between a data set of sequential data on which to perform a search of stored sequential data sets.

Referring back to the system 100 for searchable storage of sequential application programs of FIG. 1, the fingerprinting module 130 determines a unique identifier for the canonicalized sequential application programs so that they are searchable in real-time. For example, in some embodiments the fingerprinting module 130 determines a unique representation of a sequential application program, which is derived or extracted from characteristic components of the sequential application programs, themselves. That is, fingerprints are derived (e.g., extracted, generated, etc.) from the sequential application programs to which they correspond. The unique codes are used to identify the sequential application program, for example, in storage. In some embodiments a sequential application program can be represented by a unique, identifying hash code. For example, in some embodiments, the hash code comprises a numeric value which helps in identification of a corresponding sequential application program.

In accordance with the present principles, two sequential application programs which are canonically the same (which produce the same output for equivalent inputs) comprise the same fingerprint (unique code). As such, when searched, sequential application programs that are canonically similar can be located in storage by searching using the fingerprint in common. For example, in embodiments implementing hash codes, two sequential application programs are considered equal if they return equal hash codes.

Referring back to the system 100 for searchable storage of sequential application programs of FIG. 1, the unique identifiers of the canonicalized sequential application programs can be stored in a local storage 160 or a remote storage (described in greater detail below) using the storage module 140. As described above, by canonicalizing the sequential application programs before storage in accordance with the present principles, a storage means can be searched to determine if a sequential application program already exists in the storage means and/or to disprove or certify the sequential application programs. More specifically, in some embodiments, if a user has applied a specific sequential application program(s) for scientific computation and has stored the sequential application program(s) (or in some embodiments, a unique identifier of the sequential application program(s)) in a storage means in accordance with the present principles, the storage means can be searched by the same or another user(s), for example, using the optional search module 150 to determine if a sequential application program equivalent to a sequential application program to be implemented by the same or other user(s) has been stored in a local or remote storage means. Such search can also be used to disprove or certify the scientific computation performed by the user that stored the sequential application program(s) in question.

In some embodiments, the unique identifier of the sequential application programs can be stored in a blockchain. As depicted in FIG. 1, the local storage 160 illustratively includes a blockchain 170. The term 'blockchain' is used herein to include all forms of electronic, computer-based, distributed ledgers. These include but are not limited to blockchain and transaction-chain technologies, permissioned and un-permissioned ledgers, shared ledgers and variations thereof.

A blockchain is a consensus-based, electronic ledger which is implemented as a computer-based de-centralized, distributed system made up of blocks which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed.

Blockchain storage provides a de-centralized data storage and retrieval system, which provides the added benefit of distributed storage which avoids a large single point of failure and is not vulnerable to attack. Blockchain storage is also global and can be participated in at any time by anyone with access to the Internet and that has permission to participate. Blockchain storage is also transparent and once data has been written to the blockchain, anyone can see the data and the data is immutable because once data has been written to the blockchain, no one can change the data.

Sequential application programs stored in blockchains as described in accordance with the present principles, can be searched as described herein to determine if a sequential application program(s) is already stored in the blockchain(s) and, in some embodiments, to certify or disprove the sequential application programs.

It should be noted that sequential application programs can take arbitrary sets of data as input and, in general, output arbitrary sets of data. In accordance with the present principles, in some embodiments, the related data can be stored locally or globally on the same blockchain the sequential application programs are stored, as described herein, though marked as data.

In some embodiments, the storage module 140 can constructs a repository in, for example the local storage 160 or remote storage (described below), consisting of a plurality of representative sequential application programs (e.g. source code repository and assigns operators/function calls (source code) of each of the sequential application programs a unique integer identifier. Alternatively or in addition, in some embodiments the storage module 140 can construct a repository consisting of a plurality of representative sequential application programs that can be selected by a user for scientific computation. A sequential application program created by a user form the repository can then be canonicalized, a unique identifier determined for the created sequential application program and the unique identifier stored as described herein in accordance with the present principles.

In some embodiments in accordance with the present principles, machine learning techniques can be applied to learn commonalities in sequential application programs and for determining from the machine learning techniques at what level sequential application programs can be canonicalized. In some embodiments, machine learning techniques that can be applied to learn commonalities in sequential application programs can include, but are not limited to, 'SeqToSeq' Recurrent Neural Network (RNNs)/Long Short Term Memory (LSTM) networks, graph neural networks applied to the abstract syntax trees corresponding to the sequential program application.

Figure 2:
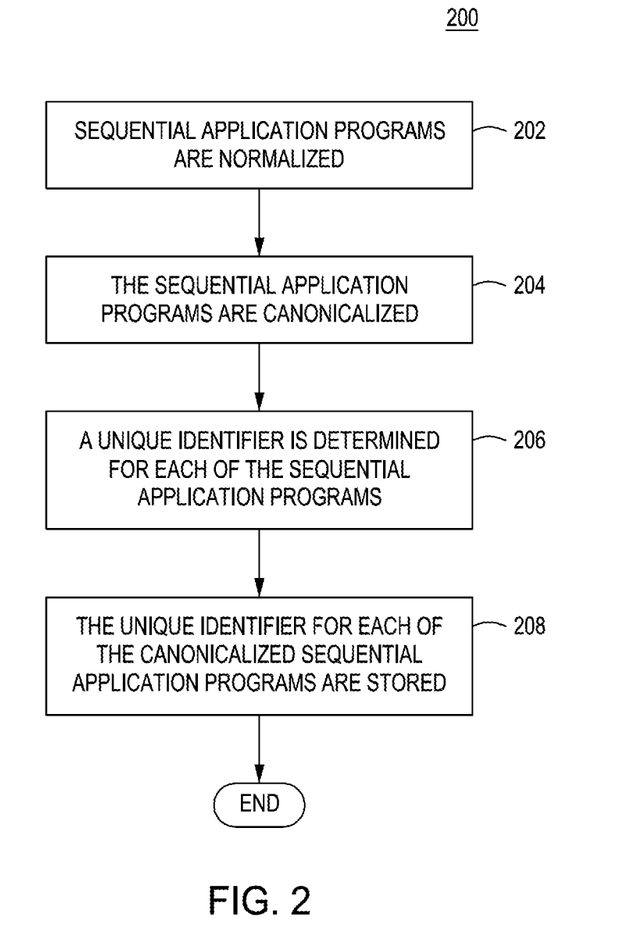
FIG. 2 depicts a flow diagram of a method for searchable storage of sequential application programs in accordance with an embodiment of the present principles.

FIG. 2 depicts a flow diagram of a method for searchable storage of sequential application programs in accordance with an embodiment of the present principles. The method 200 begins at 202 during which sequential application programs are normalized. As described above, in some embodiments including programs, a combination of the salient programming language such as an interpreter/compiler/system libraries of sequential application programs are hashed. As described above, in some embodiments the sequential application programs can be programs implemented by a user for scientific computation, such as for example astrophotography, neural electric field potential recordings, genomics, X-Ray diffraction data and the like. As further described above, in some embodiments including sequential data, data normalization can include column ordering, outlier elimination, defining common time and/or data constructs, data type definitions and the like. The method 200 can proceed to 204.

At 204, the sequential application programs are canonicalized. In some embodiments including programs and as described above, the sequential application program(s) are canonicalized by transforming the sequential application programs to an abstract deterministic finite state automaton (DFA) and computing the minimum DFA O(n log n). As further described above, in some embodiments including sequential data, the sequential application programs can be canonicalized by defining a minimum number of commonalities between data sets of sequential data on which to perform a search. The method 200 can proceed to 206.

At 206, a unique identifier is determined for each of the sequential application programs. As described above, in some embodiments the fingerprinting module 130 determines a unique identifier for the canonicalized sequential application programs so that they are searchable in real-time. For example, in some embodiments the fingerprinting module 130 determines a unique representation of a sequential application program, which is derived or extracted from characteristic components of the sequential application programs, themselves. That is, fingerprints are derived (e.g., extracted, generated, etc.) from the sequential application programs to which they correspond. The unique codes are used to identify the sequential application program, for example, in storage. In some embodiments a sequential application program can be represented by a unique, identifying hash code. For example, in some embodiments, the hash code comprises a numeric value which helps in identification of a corresponding sequential application program. The method 200 can proceed to 208.

At 208, the unique identifier for each of the canonicalized sequential application programs are stored. As described above, in some embodiments the unique identifiers of the canonicalized sequential application programs can be stored in a local storage 160 or a remote storage using the storage module 140. As described above, by canonicalizing the sequential application programs before storage in accordance with the present principles, a storage means can be searched to determine if a sequential application program already exists in the storage means and/or to disprove or certify the sequential application programs. As described above, in some embodiments, the canonicalized sequential application programs can be stored using blockchains. The method 200 can be exited.

In some embodiments in accordance with the present principles, the method 200 can further include searching the storage means to determine if a sequential application program has already been stored.

In some embodiments in accordance with the present principles, the method 200 can further include storing source code data associated with the sequential application program(s) in a repository.

FIG. 3 depicts a high-level block diagram of a computing device 300 for implementing embodiments of a system for enabling the searchable storage of sequential application programs in accordance with embodiments of the present principles. In some embodiments computing device 300 can be configured to implement methods of the present principles, such as at least the method 200 as processor-executable executable program instructions 322 (e.g., program instructions executable by processor(s) 310) in various embodiments.

In the embodiment of FIG. 3, computing device 300 includes one or more processors 310a-310n coupled to a system memory 320 via an input/output (I/O) interface 330. Computing device 300 further includes a network interface 340 coupled to I/O interface 330, and one or more input/output devices 350, such as cursor control device 360, keyboard 370, and display(s) 380. In various embodiments, any of the components can be utilized by the system to receive user input described above. In various embodiments, a user interface can be generated and displayed on display 380. In some cases, it is contemplated that embodiments can be implemented using a single instance of computing device 300, while in other embodiments multiple such systems, or multiple nodes making up computing device 300, can be configured to host different portions or instances of various embodiments. For example, in one embodiment some elements can be implemented via one or more nodes of computing device 300 that are distinct from those nodes implementing other elements. In another example, multiple nodes may implement computing device 300 in a distributed manner.

In different embodiments, computing device 300 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing device 300 can be a uniprocessor system including one processor 310, or a multiprocessor system including several processors 310 (e.g., two, four, eight, or another suitable number). Processors 310 can be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 320. In other embodiments, program instructions and/or data can be received, sent or stored upon different types of computer-accessible media or on similar media separate from system memory 320 or computing device 300.

In one embodiment, I/O interface 330 can be configured to coordinate I/O traffic between processor 310, system memory 320, and any peripheral devices in the device, including network interface 340 or other peripheral interfaces, such as input/output devices 350. In some embodiments, I/O interface 330 can perform any necessary protocol, timing or other data transformations to convert data signals from one component (e.g., system memory 320) into a format suitable for use by another component (e.g., processor 310). In some embodiments, I/O interface 330 can include support for devices attached through various types of peripheral buses, such as a variant of the Peripheral Component Interconnect (PCI) bus standard or the Universal Serial Bus (USB) standard, for example. In some embodiments, the function of I/O interface 330 can be split into two or more separate components, such as a north bridge and a south bridge, for example. Also, in some embodiments some or all of the functionality of I/O interface 330, such as an interface to system memory 320, can be incorporated directly into processor 310.

Network interface 340 can be configured to allow data to be exchanged between computing device 300 and other devices attached to a network (e.g., network 390), such as one or more external systems or between nodes of computing device 300. In various embodiments, network 390 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 can, in some embodiments, include one or more display terminals, keyboards, keypads, touchpads, scanning devices, voice or optical recognition devices, or any other devices suitable for entering or accessing data by one or more computer systems. Multiple input/output devices 350 can be present in computer system or can be distributed on various nodes of computing device 300. In some embodiments, similar input/output devices can be separate from computing device 300 and can interact with one or more nodes of computing device 300 through a wired or wireless connection, such as over network interface 340.

In some embodiments, the illustrated computing device 300 can implement any of the operations and methods described above, such as the methods illustrated by the flowcharts of FIG. 2. In other embodiments, different elements and data can be included.

Those skilled in the art will appreciate that computing device 300 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing device 300 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from computing device 300 can be transmitted to computing device 300 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 4:
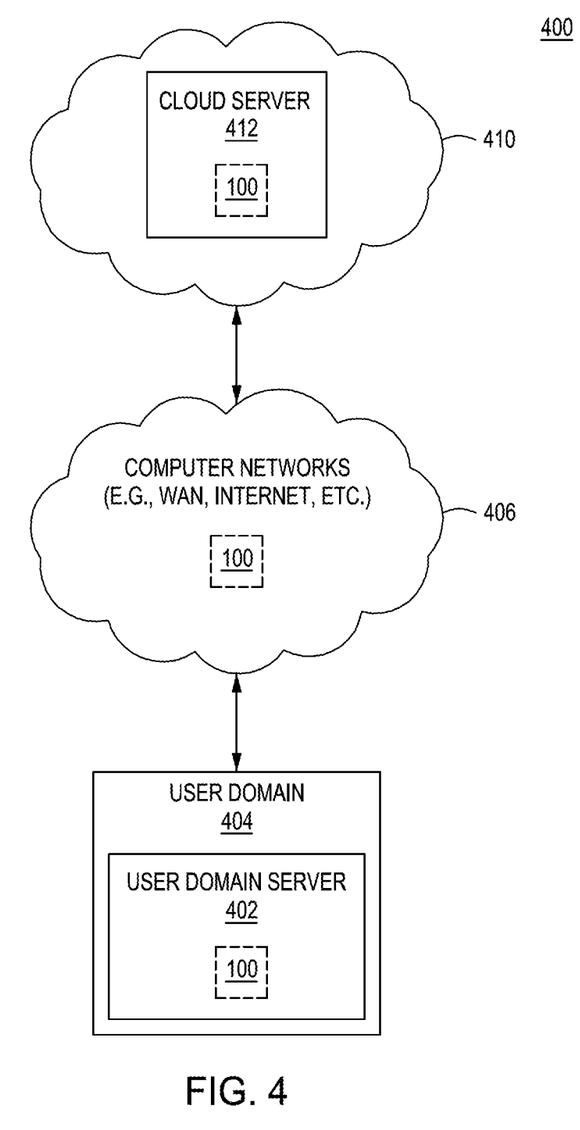
FIG. 4 depicts a high-level block diagram of a network in which embodiments of a system for enabling the searchable storage of sequential application programs in accordance with the present principles can be applied.

FIG. 4 depicts a high-level block diagram of a network in which embodiments of a system for enabling the searchable storage of sequential application programs in accordance with the present principles can be applied. The network environment 400 of FIG. 4 illustratively comprises a user domain 402 including a user domain server 404. The network environment 400 of FIG. 4 further comprises computer networks 406, and a cloud environment 410 including a cloud server 412.

In the network environment 400 of FIG. 4, a system for enabling the searchable storage of sequential application programs in accordance with the present principles, such as the system 100 of FIG. 1, can be included in at least one of the user domain server 404, the computer networks 406, and the cloud server 412. That is, in some embodiments, a user can use a local server (e.g., the user domain server 404) to provide sequential application programs and associated data in accordance with the present principles. Similarly, in some embodiments, a system for enabling the searchable storage of sequential application programs in accordance with the present principles can use a local storage means for storing data and unique identifiers of canonicalized sequential application programs.

In some embodiments, a user can implement a system for enabling the searchable storage of sequential application programs in the computer networks 406 to provide sequential application programs and associated data in accordance with the present principles. Similarly, in some embodiments, a system for enabling the searchable storage of sequential application programs in accordance with the present principles can use a network storage means for storing data and unique identifiers of canonicalized sequential application programs. Alternatively or in addition, in some embodiments, a user can implement a system for enabling the searchable storage of sequential application programs in the cloud server 412 of the cloud environment 410 to provide sequential application programs and associated data in accordance with the present principles. Similarly, in some embodiments, a system for enabling the searchable storage of sequential application programs in accordance with the present principles can use a cloud storage means for storing data and unique identifiers of canonicalized sequential application programs. in accordance with the present principles. For example, in some embodiments it can be advantageous to perform processing functions of the present principles in the cloud environment 410 to take advantage of the processing capabilities and storage capabilities of the cloud environment 410. In some embodiments in accordance with the present principles, a system for enabling the searchable storage of sequential application programs can be located in a single and/or multiple locations/servers/computers to perform all or portions of the herein described functionalities of a system in accordance with the present principles.

Embodiments of methods, apparatuses and systems for the searchable storage of sequential application programs in accordance with the present principles can be used for many applications. For example, embodiments in accordance with the present principles can be implemented in scientific applications (e.g., astrophotography, neural electric field potential recordings, genomics, X-Ray diffraction data, pharmaceutical applications and the like) by enabling a certification and search of experimental scientific sequential application programs and resulting data by providing a searchable storage of unique identifiers of canonicalized versions of the programs and data. In a commercial setting, embodiments in accordance with the present principles enable large-scale experimental and analysis runs to be archived in a searchable manner to establish a clear record of experimental scientific formulas and resulting data. Embodiments in accordance with the present principles can be used to determine if a series of scientific experiments has already been performed and for the retrieval of associated data. In addition, embodiments in accordance with the present principles can be used to canonicalize sequentially obtained scientific data and to store unique identifiers of such data to enable the efficient verification of the existence and the retrieval of such data.

Embodiments of methods, apparatuses and systems for the searchable storage of sequential application programs can further be implemented in medical applications. For example, embodiments in accordance with the present principles can be implemented to memorialize medical procedures performed and outcomes of such procedures including resulting medical effects on patients and/or lab animals and associated data. Embodiments in accordance with the present principles can be used to determine if a series of medical procedures has already been performed and for the retrieval of associated data. In addition, embodiments in accordance with the present principles can be used to canonicalize sequentially obtained medical data and to store unique identifiers of such data to enable the efficient verification of the existence and the retrieval of such data.

Embodiments of methods, apparatuses and systems for the searchable storage of sequential application programs can further be implemented in financial applications. For example, embodiments in accordance with the present principles can be implemented to memorialize financial procedures performed for, for example hedging and investing, and outcomes of such procedures including resulting financial effects on a portfolio and associated data. Embodiments in accordance with the present principles can be used to determine if a series of financial procedures has already been performed and for the retrieval of associated data. In addition, embodiments in accordance with the present principles can be used to canonicalize sequentially obtained financial data and to store unique identifiers of such data to enable the efficient verification of the existence and the retrieval of such data.

Many more applications can take advantage of embodiments of methods, apparatuses and systems for the searchable storage of sequential application programs in accordance with the present principles.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A computer-implemented method for enabling the computer searchable storage of sequential application programs, comprising:
   normalizing the sequential application programs, wherein the sequential application programs include data processing pipelines (DPPs) that consist of sequential applications of processes from at least one of mathematical, statistical, or signal processing libraries in which processes from the library transform data in a step-wise fashion, wherein each step feeds the output as an input to the next step;
   canonicalizing the sequential application programs that are normalized;
   determining a unique identifier for each of the sequential application programs that are canonicalized; and
   storing the unique identifier in a storage device that can be searched for each of the sequential application programs.

2. The method of claim 1, further comprising searching the stored, unique identifiers.

3. The method of claim 2, wherein the stored unique identifiers are searched to certify at least one of the sequential application programs.

4. The method of claim 1, comprising:
   transforming the sequential application programs to an abstract deterministic finite state automaton (DFA) and computing a minimum DFA O(nlog n) to canonicalize the sequential application programs.

5. The method of claim 1, comprising:
   defining a minimum number of commonalities between the sequential application programs to canonicalize the sequential application programs.

6. The method of claim 5, wherein the sequential application programs comprise sequential data.

7. The method of claim 1, wherein the unique identifier comprises a hash code.

8. The method of claim 1, further comprising creating a repository of source codes for the sequential application programs.

9. An apparatus for enabling the searchable storage of sequential application programs, comprising:
   a normalizing module normalizing the sequential application programs, wherein the sequential application programs include data processing pipelines (DPPs) that consist of sequential applications of processes from at least one of mathematical, statistical, or signal processing libraries in which processes from the library transform data in a step-wise fashion, wherein each step feeds the output as an input to the next step;
   a canonicalizing module canonicalizing the sequential application programs that are normalized;
   a fingerprinting module determining a unique identifier for each of the sequential application programs that are canonicalized; and
   a storage module storing the unique identifier in a storage device that can be searched for each of the sequential application programs.

10. The apparatus of claim 9, further comprising a search module searching the stored, unique identifiers to determine if a sequential application program is stored.

11. The apparatus of claim 9, wherein the canonicalizing module transforms at least one of the sequential application programs to an abstract deterministic finite state automaton (DFA) and computes a minimum DFA O(nlog n) to canonicalize the at least one of the sequential application programs.

12. The apparatus of claim 9, wherein the canonicalizing module defines a minimum number of commonalities between the sequential application programs to canonicalize the sequential application programs.

13. The apparatus of claim 9, comprising a local storage.

14. The apparatus of claim 13, wherein the local storage comprises at least one blockchain.

15. The apparatus of claim 9, wherein the storage module creates a repository of source codes for the sequential application programs.

16. A non-transitory computer-readable medium having stored thereon at least one program, the at least one program including instructions which, when executed by a processor, cause the processor to perform a method for enabling the searchable storage of sequential application programs, comprising:
   normalizing the sequential application programs, wherein the sequential application programs include data processing pipelines (DPPs) that consist of sequential applications of processes from at least one of mathematical, statistical, or signal processing libraries in which processes from the library transform data in a step-wise fashion, wherein each step feeds the output as an input to the next step;
   canonicalizing the sequential application programs that are normalized;
   determining a unique identifier for each of the sequential application programs that are canonicalized; and
   storing the unique identifier in a storage device that can be searched for each of the sequential application programs.

17. The non-transitory transitory computer-readable medium of claim 16, wherein, in response to the instructions, the processor further searches the stored canonicalized sequential application programs.

18. The non-transitory transitory computer-readable medium of claim 17, wherein the stored canonicalized sequential application programs are searched to certify at least one of the stored canonicalized sequential application programs.

19. The non-transitory transitory computer-readable medium of claim 17, comprising a repository of source codes for the sequential application programs.

20. The non-transitory transitory computer-readable medium of claim 16, wherein the unique identifiers of each of the sequential application programs are stored in at least one blockchain.

* * * * *